UNITED STATES PATENT OFFICE.

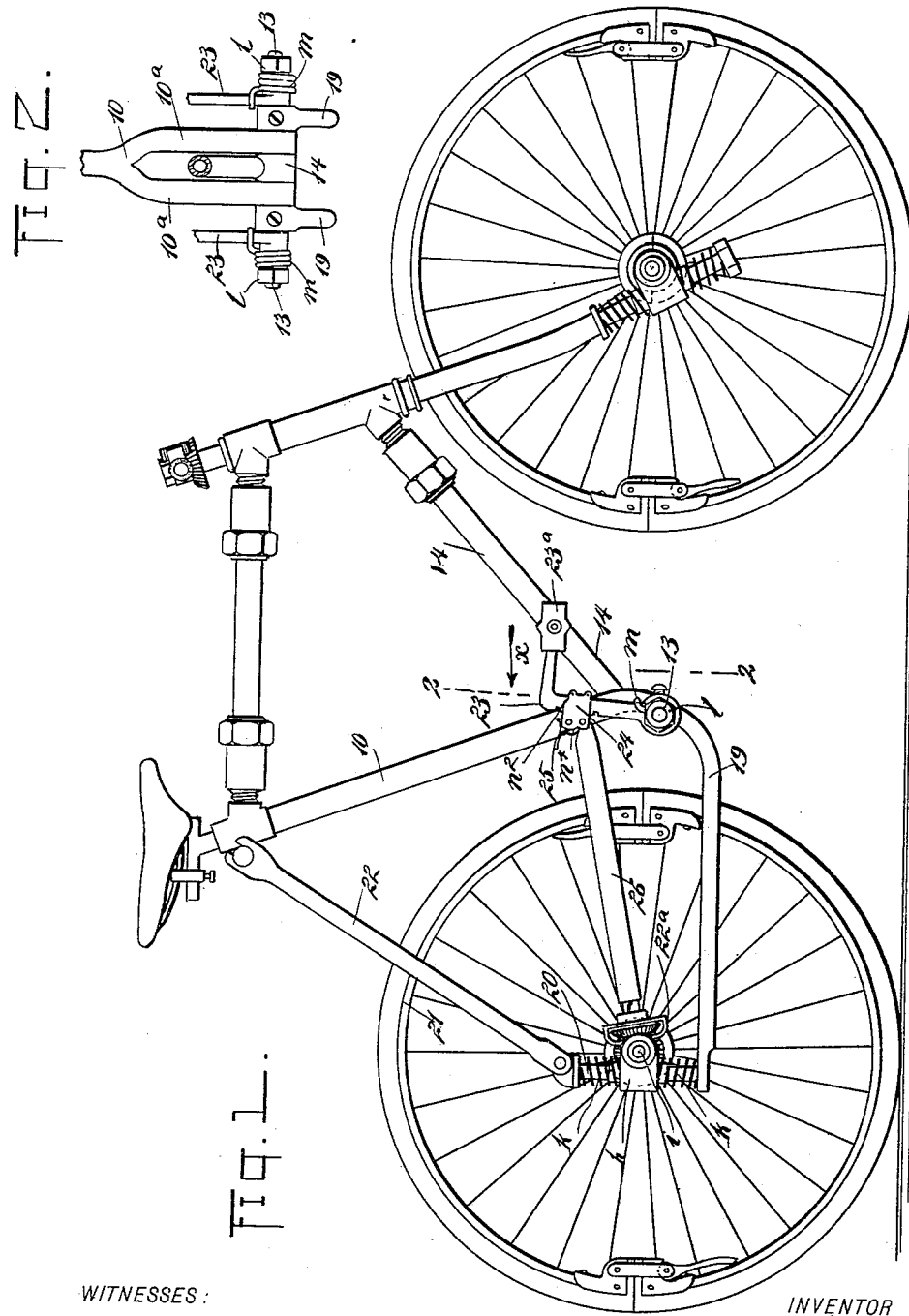

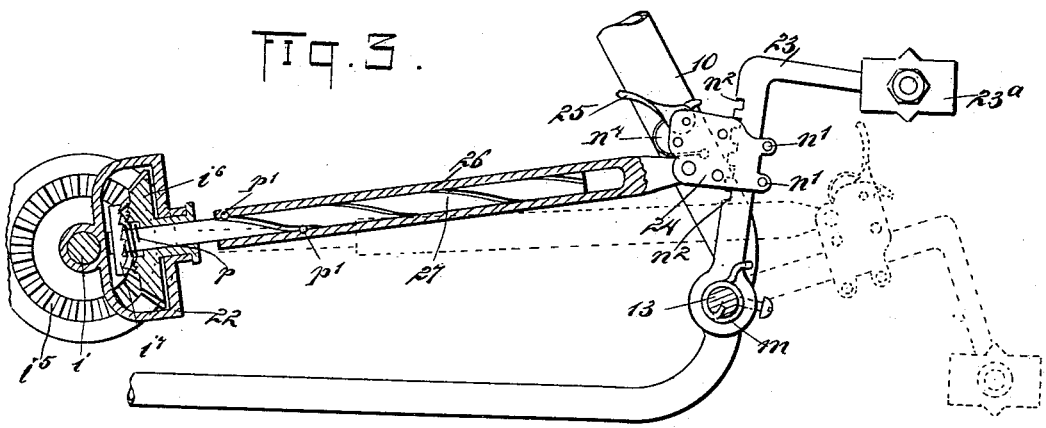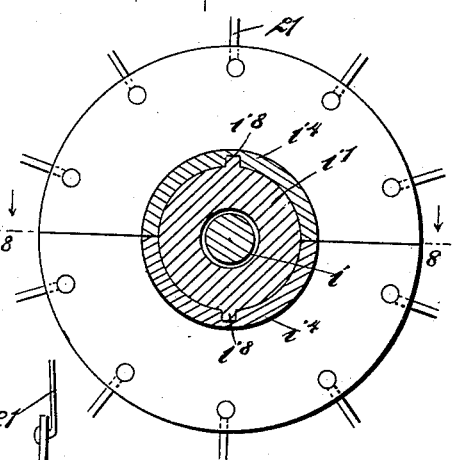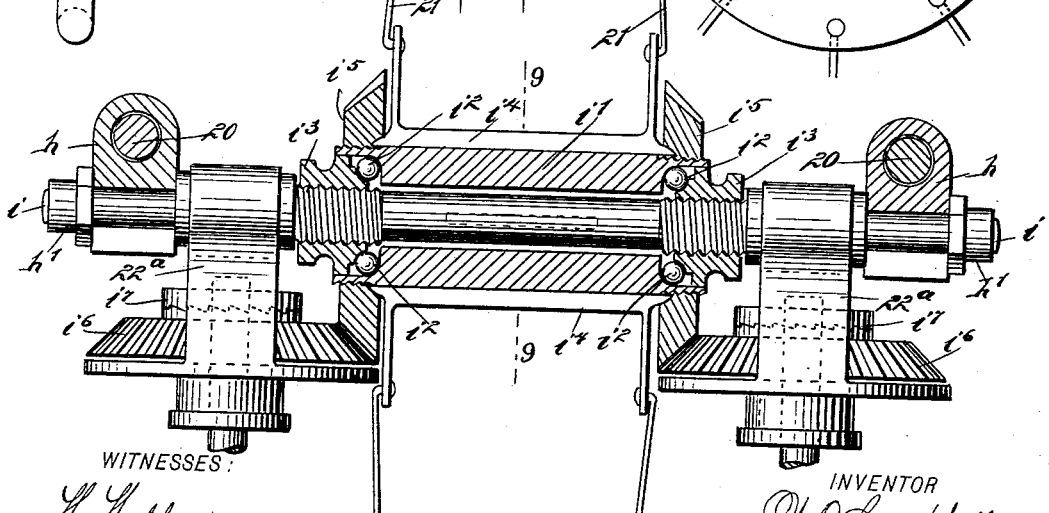

WINDSOR O. CAMPBELL, OF SULPHUR SPRINGS, ARKANSAS.

BICYCLE.

SPECIFICATION forming part of Letters Patent No. 618,330, dated January 24, 1899.

Application filed August 17, 1897. Serial No. 648,528. (No model.)

*To all whom it may concern:*

Be it known that I, WINDSOR O. CAMPBELL, of Sulphur Springs, in the county of Benton and State of Arkansas, have invented a new and useful Improvement in Bicycle-Gears, of which the following is a full, clear, and exact description.

The invention provides independent pedal movements of the lever type, which afford means to adjust the length of the stroke had by each pedal-lever while the bicycle is in motion.

The invention also embodies novel quick-pitch screw connections for the pedals, with motor-gearing employed to drive the rear traction-wheel, and provides two-part traction-wheels and two-part tires for such wheels, together with novel means for quickly and reliably joining the parts of the wheels together and holding the tire thereon.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a side elevation of the improved bicycle. Fig. 2 is a transverse partly-sectional view of portions of the frame and other details supported thereon, taken substantially on the line 2 2 in Fig. 1 and seen in the direction of the arrow $x$ in said figure. Fig. 3 is an enlarged partly-sectional side view of one of the pedal-levers and novel connecting devices between said lever and the rear axle for the transmission of motion and power to said axle and the wheel thereon. Fig. 4 is a detached side view of one of the pedal-arms and a sectional side view of an adjustable fulcrum-box thereon, which affords a changeable connection between the pedal-arm and the motor device. Fig. 5 is an enlarged sectional plan view of the rear traction-wheel, essentially on the line 8 8 in Fig. 9. Fig. 6 is a transverse sectional view, substantially on the line 9 9 in Fig. 8.

The bicycle-frame may be of any preferred construction, except that the saddle-post 10 is forked at its lower end to form arms $10^a$, which carry the pedal-shaft 13. The brace 14 of the frame runs from between the arms $10^a$ to the steering-post. The pedal-shaft 13 is held rigidly by two stringers that are located one on each side of the fork $10^a$ and run rearward to the driving-wheel 21, where they are respectively rigidly attached to rods 20. The rods 20 extend upward on each side of the driving-wheel 21 and respectively slide through boxes $h$, attached to the axle $i$ of the wheel 21. The back braces 22 of the frame are respectively attached to the rods 20. Two springs $h$ encircle each rod 20, respectively above and below the boxes $h$. These parts will be fully described hereinafter.

On the rear axle $i$, near its longitudinal center, a cylindrical skein $i'$ is loosely placed, having its end portions externally threaded and interiorly cupped to receive bearing-balls $i^2$. At each end of the skein $i'$ the axle $i$ is threaded, and the ball-bearing nuts $i^3$ are screwed upon these threaded portions of the axle.

The two-part hub pieces $i^4$ are held in close engagement with the cylindrical skein $i'$ by the internally-threaded bevel-gears $i^5$, screwed on the ends of the skein, as shown in Fig. 8, so that the cupped inner edges of the threaded holes in said gears will be adapted to forcibly bear upon the beveled ends of the two contacting hub-sections $i^4$.

Near the longitudinal center of the cylindrical skein $i'$ one or more locking projections $i^8$ are formed thereon, which enter mating orifices or sockets in the hub-sections $i^4$, these projections providing positive driving connections between the hub-sections and the cylindrical skein, as represented in Fig. 5.

It will be seen that the spokes which radiate from the peripheral flanges at the ends of the two-part hub $i^4$ to be secured in the rim-sections of the wheel 21 will be so disposed with said rim-sections that the ends of the spokes will have opposite positions and the rim portions will occupy the same plane.

The two-part hub, the cylindrical skein, the front axle, and the ball-bearing devices thereon, as well as the two-part wheel-rim for the front traction-wheel, are all exact duplications in form for the rear traction-wheel, with the single exception that there are no teeth on the clamping-disks $i^9$ that in the front wheel supplant the bevel-gears $i^5$ of the rear wheel, and it is therefore unnecessary to duplicate said parts in the drawings.

On the rear axle $i$, outside of the ball-bearing nuts $i^3$, between collars on said axle, two bracket-frames $22^a$ are loosely located by an engagement of transversely-perforated bosses on said frames with the axle, as shown in Fig. 6, and on extensions of the axle beyond the outer sides of the bracket-frames $22^a$ the axle-boxes $h$, before mentioned, are held by the nuts $h'$, which are screwed upon the extremities of the axle.

To facilitate the disconnection of the axle $i$ from the boxes $h$, the latter are preferably slotted to render their fronts open, as shown in Fig. 6, which will permit a quick disconnection of these parts when the bicycle-frame is to be folded.

The pedal-arms 23, provided in duplicate for the bicycle, are held to rock on opposite ends of the pedal-shaft 13 by nuts $l$, as indicated in Fig. 2. Each of the pedal-arms 23 consists of a metal bar bent into angular form, as shown in Figs. 1, 3, and 4, thus producing two limbs preferably disposed at a right angle to each other. The free end of the longer limb of the pedal-arm shown is perforated laterally and mounted therethrough on the pedal-shaft to rock thereon, as before mentioned.

The normal position of the pedal-arms 23 is represented in Figs. 1 and 3, and it will be seen that the main limb thereof is upright, while the remaining member is forwardly projected and has the usual pedal $23^a$ loosely held thereon at its free end. The similar pedal-arms 23 are in a like manner elastically maintained in an upright position by the coiled springs $m$, one of which is provided for each arm and is secured by one end upon the shaft 13, the other extremity of said spring being bent around the front edge of the arm 23, so that the stress of the spring will be adapted to hold the pedal-arm when at rest in the position indicated in Figs. 1 and 3.

A fulcrum-box 24 is loosely placed on the upright member of each pedal-arm 23, and each box consists of two side plates held spaced apart in parallel planes by the angular web-plate $n$. Each fulcrum-box 24 is held to slide on the arm 23 by the transverse bolts $n'$, secured in projections on the side plates, these bolts having a loose contact with one edge of the pedal-arm, the parallel opposite edge of which arm is loosely impinged upon by a member of the angular web-plate $n$, as shown in Fig. 7.

A series of spaced notches $n^2$ is formed in the rear edge of the upright member of each pedal-arm 23, either of which notches in either arm being adapted to receive a locking end of a slide-bolt $n^3$, loosely secured in the fulcrum-box 24 on said arm. The slide-bolts $n^2$ each have an upright arm at the outer end, and said bolts are pressed toward the notched edge of a pedal-arm to be engaged therewith by a bent spring $n^4$, secured at one end to one of the side plates of the fulcrum-box containing the slide-bolt and seated at its opposite end in a notch formed in the outer edge of the upright arm of the slide-bolt.

On the inner surface of one side wall of the fulcrum-box 24 a tripping-lever 25 is pivoted and held to normally project from the box in a rearward direction. The portion of the lever 25 pivoted upon the fulcrum-box is in disk form, as shown in Fig. 7, and from said portion above and below the pivot therein two ears $o$ project and loosely contact with the forward edge of the upright arm of the slide-bolt $n^3$, and said ears limit the movement of the bolt-body toward the pedal-arm member under the stress of the spring $n^4$.

It will be seen that from the position given the tripping-lever 25 on each fulcrum-box 24 the lever may be conveniently rocked to draw the slide-bolt $n^3$ away from an engaged notch in the pedal-arm 23 by the application of the toe of the rider's shoe. This may be readily effected either by the application of the foot below the lever or upon it, as in either case one of the ears $o$ will be rocked against the upright arm of the slide-bolt and push the latter away from the upright notched member of the pedal-arm, so that the fulcrum-box on each pedal-arm may be moved toward or from the pedal-shaft 13, as may be desired, and be automatically locked at a suitable point, whereby the leverage of the pedal-arms may be increased or diminished as the requirements of service may dictate.

On the rear portion of each fulcrum-box 24, below the slide-bolt $n^3$ thereon, the forward end of a tubular thrust-bar 26 is pivoted, as shown clearly in Figs. 1, 3, and 4. Within each thrust-bar 26 a driving-shaft 27 is introduced, which shafts are each furnished with one or more spiral grooves of very quick pitch, the grooves in each shaft 27 extending nearly the entire length of the same.

Each of the bracket-frames $22^a$, before mentioned as having a loose engagement with the end portions of the rear axle $i$, has its body apertured laterally to permit the free location therein of a bevel-gear $i^6$, which meshes with an adjacent bevel-gear $i^5$.

The forward side of the bracket-frame 22, at each side of the bicycle, is perforated to receive a cylindrical hub projecting from the bevel-gear occupying said bracket-frame, and the rear end of one of the driving-shafts 27 is inserted loosely through the bore of the hub of the bevel-gear.

On the rear end of the shaft 27, that projects through a respective bevel-gear $i^6$, a locking-disk $i^7$ is affixed, which disk has its forward face serrated to permit it to lock fast to like serrations in the rear face of the hub on the bevel-gear $i^6$, as indicated in Figs. 3 and 6. A coiled spring $p$ is introduced between the serrated disk and bevel-gear $i^6$ at each side of the bicycle, which springs when expanded hold the disks from engaging with adjacent gear-wheels.

One or more hardened balls $p'$ are seated in cupped recesses formed in the inner wall of each hollow thrust-bar 26 at proper points for the loose engagement with the spiral groove in each driving-shaft 27, which will adapt a rearward movement of each thrust-bar to transmit rotary motion to a respective driving-shaft, and from it, through the bevel-gears $i^5$ $i^6$, to the rear axle $i$ for the rotation of the rear traction-wheel 21.

It will be evident from the foregoing description that a rider on the bicycle may, simultaneously or alternately, depress the pedal-arms 23 by pressure on the pedals $23^a$, so as to rock said arms forward, which will pull upon the bars 26, and these in turn will draw the shafts 27 slightly forward and at the same time rotate them. The forward pull on the driving-shafts 27 will interlock the serrations on the disks $i^7$ with the like formations on the bevel-gears $i^6$, which will temporarily lock the said gears upon the respective driving-shafts 27, and thus complete an operative connection between the pedal-arms and the rear traction-wheel of the bicycle.

For a regular movement of the bicycle it is of advantage to alternately rock the pedal-arms 23 forwardly, which will render one set of bevel-gears at one side of the machine active, while the opposite set becomes dormant, as the spring that presses the pedal-arm upwardly serves to push the bar 26 rearward and simultaneously release the disk $i^7$ from the bevel-gear $i^6$ at that side of the bicycle.

Having thus described my invention, I claim as new and desire to secure by Letters Patent—

1. The combination with a lever having notches therein, of a fulcrum-box slidable on the lever, a slide-bolt mounted in the fulcrum-box and capable of engaging with the notches of the lever, a spring pressing the slide-bolt, and a tripping-lever mounted on the box and having connection with the slide-bolt to move the same against the spring.

2. The combination of a fulcrum-box adapted to be mounted on a lever, a slide-bolt mounted in the fulcrum-box and capable of engaging the lever to fix the fulcrum-box, a spring pressing the slide-bolt, and a tripping-lever mounted to rock in the fulcrum-box and having two ears located respectively on opposite sides of its fulcrum, the ears engaging the locking-disk.

3. The combination with a bicycle of a gear-wheel mounted thereon and having connection with the driving-wheel of the bicycle, a drive-shaft revolubly and axially movable with relation to the gear-wheel, a locking-disk attached to the drive-shaft and capable of locking therewith, an expansive spring interposed between the gear-wheel and locking-disk, a hollow thrust-shaft receiving the drive-shaft and having threaded connection therewith and a pedal-lever connected with the thrust-shaft.

WINDSOR O. CAMPBELL.

Witnesses:
L. E. MITCHELL,
JAMES A. DANIEL.